MAGEE & TOWNE.
Stove.
No. 1,356. Reissued Nov. 18, 1862.
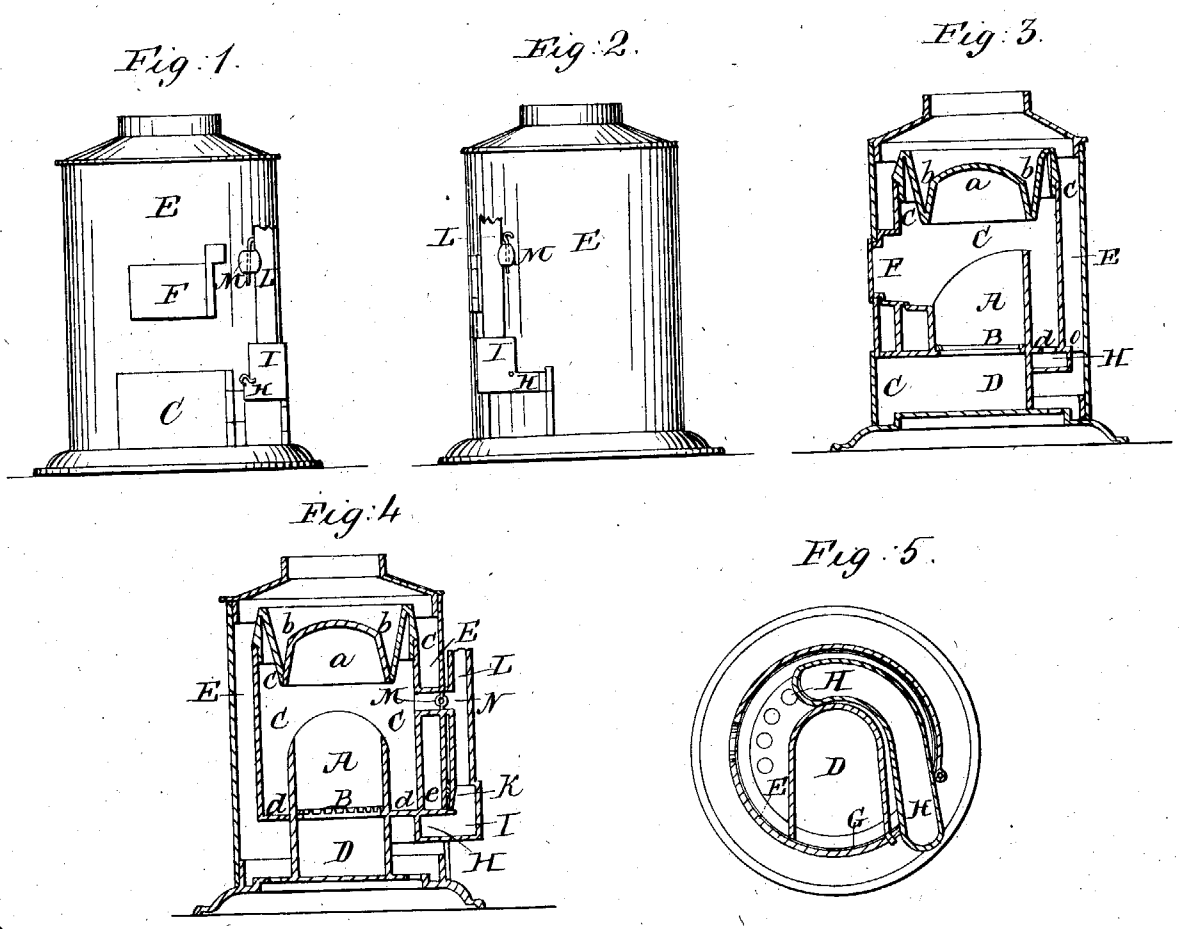
Witnesses.
R. H. Eddy
F. P. Hale Jr
Inventors.
John Magee
Wm J. Towne
N. PETERS. Photo-Lithographer, Washington, D. C.

UNITED STATES PATENT OFFICE.

JOHN MAGEE, OF CHELSEA, AND WILLIAM J. TOWNE, OF NEWTON, MASSACHUSETTS.

IMPROVEMENT IN STOVES.

Specification forming part of Letters Patent No. 29,608, dated August 14, 1860; Reissue No. 1,356, dated November 18, 1862.

*To all whom it may concern:*

Be it known that we, JOHN MAGEE, late of Lawrence, in the county of Essex, but now of Chelsea, in the county of Suffolk, and WILLIAM J. TOWNE, of Newton, in the county of Middlesex and State of Massachusetts, have i nvented a new and useful Improvement in Stoves or Furnaces for Heating Apartments; nd we do hereby declare the same to be fully escribed in the following specification and lustrated in the accompanying drawings, of which—

Figure 1 is a front and Fig. 2 a side elevation of a stove or furnace containing our invention. Fig. 3 is a vertical section taken through the middle of its fire-pot throat. Fig. 4 is a vertical section taken through its air box and valve and eduction-pipe. Fig. 5 is a horizontal section taken through the leading conduit of the air-box.

The nature of our invention consists in a peculiar arrangement of the valve-box and valve and their leading and discharging conduits relatively to the mouth of the furnace and the smoke escape passage in rear of the fire-pot.

In the drawings, A denotes the fire pot, provided with a grate, B, and placed with a chamber or case, C, and directly over a chamber or ash-pit, D, as represented. The chamber C is the smoke-space or heat-radiator, and is in turn situated within or surrounded by an external case or air-reservoir, E. Two throats, F G, one for the supply of fuel to the fire pot, the other for opening a communication into the ash-chamber, are made to open out of the outer case in the usual manner. The cap of the chamber of combustion or smoke space C is constructed with a central chamber, *a*, a surrounding annular air-space, *b*, and a concentric smoke space, *c*. Both the spaces *a* and *c* open at their lower ends directly into the chamber C, while the space *b* leads into the air-chamber and radiates heat into the same. Through the bottom *d* of the chamber C is an escape opening or passage, *o*, that leads into the rear part of a curved pipe on conduit, H, which is extended toward the front of the furnace and through and out of its outer case, where the front part of the said pipe is surmounted by a valve box, I, in which a valve, K, is arranged or applied so that while standing in a vertical position it shall cover one air-inlet opening *e*, but when inclined to its lowest position it shall extend across the air-box, so as to cut off the passage of smoke through the same, and into the discharging conduit which surmounts the valve-box. By means of the valve and its air-opening applied to the discharge-pipe air can be let into the latter. The application of this valve and box applied to a discharge-pipe of a stove or furnace is not new, and we do not herein claim it as such. A direct draft-pipe, M, furnished with a damper, N, leads out of the chamber C and into the escape-pipe L.

In the operation of this air-heating apparatus the smoke and volatile products of combustion after escaping from the fuel rise in contact with the cap or into its concentric spaces *a c*, and from thence they pass down around the fire-pot and into the passage *d*, thence through the leading-pipe H, the valve-box, and eduction-pipe. By opening the damper of the direct draft-pipe and turning the valve of the valve-box so as to open the air-inlet and cut off the passage of the smoke through the pipe I, the smoke will be caused to pass off by the direct draft-pipe.

In this stove or heating apparatus the valve-box, as well as the direct-draft flue and their damper and valve, are brought to its front and close to the side of the fuel and ash-pit openings instead of being at the rear part of the stove or furnace. When situated as last described, they are in an inconvenient position for a person to obtain access to them while standing in front of the stove or furnace, they requiring him to go around to the rear part of the apparatus in order to operate the damper or valve. With our arrangement the damper and valve are in such contiguity with the front part of the apparatus as to be easily reached by a person while standing in front of the mouth of the furnace.

What we claim is—

The new arrangement of the smoke pipes and air valve and mouth of the furnace, or their equivalents, so that they are brought into proximity on the same side of the furnace, substantially in the manner and for the purpose hereinbefore described.

JOHN MAGEE.
WM. J. TOWNE.

Witnesses:
R. H. EDDY,
F. P. HALE, Jr.